I. C. MOULTON.
HOISTING DEVICE.
APPLICATION FILED APR. 17, 1912.
1,124,938.
Patented Jan. 12, 1915.
2 SHEETS—SHEET 2.
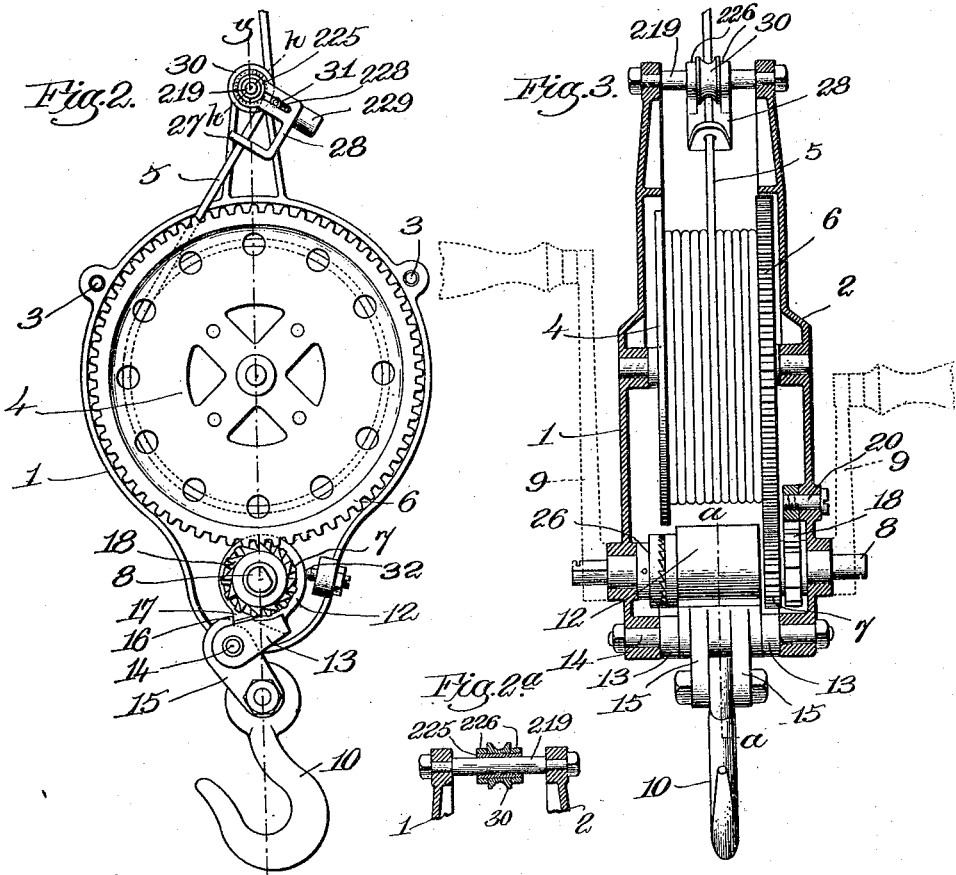
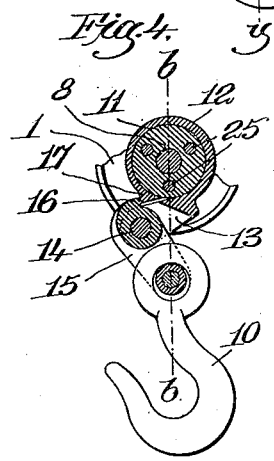
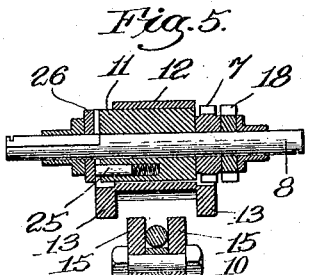
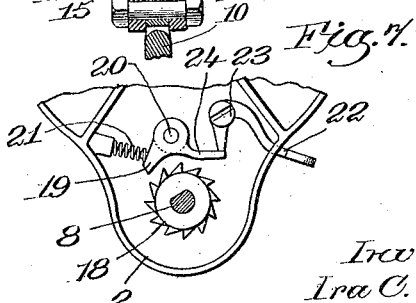
Witnesses.
Thomas J. Drummond
Warren O'Neil.
Inventor
Ira C. Moulton,
by Edwards Hand & Smith
attys.

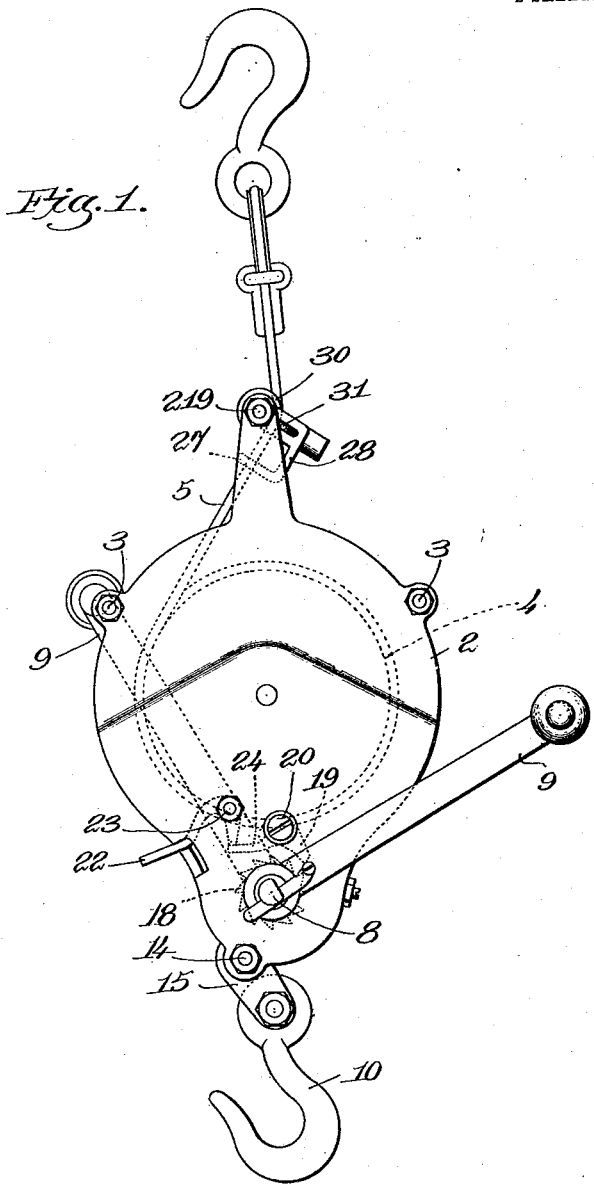

UNITED STATES PATENT OFFICE.

IRA C. MOULTON, OF BOSTON, MASSACHUSETTS, ASSIGNOR TO SIMPLEX SELF-HOISTING MACHINE COMPANY, OF WALTHAM, MASSACHUSETTS, A CORPORATION OF MASSACHUSETTS.

HOISTING DEVICE.

1,124,938.        Specification of Letters Patent.        Patented Jan. 12, 1915.

Application filed April 17, 1912. Serial No. 691,360.

*To all whom it may concern:*

Be it known that I, IRA C. MOULTON, a citizen of the United States, residing at Boston, county of Suffolk, State of Massachusetts, have invented an Improvement in Hoisting Devices, of which the following description, in connection with the accompanying drawing, is a specification, like characters on the drawing representing like parts.

This invention relates to hoisting apparatus and particularly to a hoisting device that is especially adapted for the use of painters, carpenters, and other workmen.

The features wherein my invention resides will first be described and then pointed out in the appended claims.

Referring to the drawings wherein I have shown several embodiments of my invention, Figure 1 is a side view of a device embodying my invention; Fig. 2 is a vertical sectional view through the device shown in Fig. 1; Fig. 2ª is a section on the line $h$—$h$, Fig. 2; Fig. 3 is a section on the line $y$—$y$, Fig. 2; Fig. 4 is a section on the line $a$—$a$, Fig. 3; Fig. 5 is a section on the line $b$—$b$, Fig. 4; Fig. 6 is a detail of the clutch mechanism; Fig. 7 is a detail of the lock.

The device as a whole comprises a casing, a reel sustained therein and about which is wound a cable or rope, one end of which is adapted to be secured to the top of a building, means for operating the reel to wind the rope up thereon or unwind it therefrom, a hook for suspending a ladder, sling, basket, or other support from the device, and suitable brake mechanism for holding the reel from backward rotation. The casing herein shown is formed with the two side pieces 1 and 2 that are connected at suitable points by tie-rods or bolts 3, 14 and 23.

4 designates a reel that is journaled in the casing and on which is wound a cord or cable 5. When the device is in use, the upper end of the cord or cable is fastened to the roof of a building or any other solid support.

Referring to the embodiment shown in Figs. 1 to 6, the reel has integral therewith a gear-wheel 6 which meshes with and is driven by a pinion 7 on a crank shaft 8 that is journaled in suitable bearings formed in the frame. This crank shaft 8 has handles or cranks 9 applied thereto by which it may be turned.

10 designates a hook suspended from the device and to which a basket, seat, sling, ladder, etc., may be sustained.

Associated with the crank shaft 8 is a brake adapted to apply braking pressure thereto thereby to permit a person sustained by the device to gradually lower himself by allowing the cable to unwind from the reel, and a locking pawl to lock the reel from unwinding. The brake shown in Figs. 1 to 6 is of such a construction that the braking pressure thereof will vary according to the weight on the hook 10.

The shaft 8 has associated therewith a brake drum 11 which is encircled by a brake band 12. One end of the brake band is provided with ears 13 through which the bolt 14 extends, and a lever 15 is mounted pivotally on said bolt and has at its upper end a lip or finger 16 to engage a shoulder 17 formed on the free end of the brake band 12. The hook 10 is sustained from the lower end of the lever 15 and the construction is such that said lever normally occupies an inclined position with the point of connection between the hook and the lever out of line vertically with the bolt 14, as seen from Fig. 4. Any weight applied to the hook 10 tends to swing the lever 15 toward a vertical position, as will be obvious, and this action of the lever will bring the lip 16 against the shoulder 17 and will thereby tighten the brake band about the brake drum. The degree of frictional pressure between the brake band and the brake drum will, therefore, depend upon the amount of weight sustained by the hook 10.

The shaft 8 has fast thereon a ratchet wheel 18, and the side piece 2 of the casing carries a stop pawl 19 which is pivoted thereto at 20. This pawl is acted on by a spring 21 which tends to force it into engagement with the ratchet wheel 18, said pawl and ratchet being so disposed as to prevent backward rotation of the crank shaft 8. The pawl 19 can be disengaged from the ratchet 18 by means of a lever 22 pivoted at 23 and having one end projecting beyond the casing. This lever 22 has a flat end 221 and the pawl 19 is formed with the flat face 24, the two parts being so constructed that when the outer end of the lever 22 is lifted into the position shown in Fig. 7, the inner end acts against the flat face 24 of the pawl and throws said pawl out of engagement with the ratchet against the action of the spring 21. The two flat faces 24 and 221 serve to lock the pawl and hold it in its inoperative position. When the lever 22 is thrown downwardly into the dotted line position it becomes disengaged from the face 24 and the pawl 19 is thrown into engagement with the ratchet 18 by the spring 21.

The brake drum 11 is provided with a plurality of spring-pressed pawls 25 which coöperate with a ratchet disk 26 fixed to the shaft 8. The brake drum 11 is not fast on the shaft, but is only connected thereto through the pawls 25 and ratchet disk 26.

32 designates an adjustable stop to limit the expanding movement of the brake band.

The cable 5 passes through a guide-eye 27 in a cable-guide 28 that is slidably mounted on a pin or tie bolt 219 that connects the side pieces 1 and 2. The cable-guide has loosely mounted therein a sleeve 225 which is capable of turning therein, and on which is rotatably mounted a guide pulley 30 over which the cord or cable 5 passes, said pulley 30 being confined between arms 226 on the cable-guide. By loosely mounting the pulley on a sleeve 225 which turns freely in the cable-guide on the pin 219, I find that the cable-guide will freely slide back and forth on the pin 219 as the cable is wound up or unwound on the drum 4, even though a considerable weight is being sustained by the cable.

31 designates a tension device which is acted upon by a suitable spring 228 that is confined in the pocket 229 of the cable-guide and that holds the tension device 31 firmly against the cable. The purpose of this tension device is to prevent the cable from becoming loosened on the drum when the device is not in use.

In the operation of this device, the person occupying the sling, seat, basket or other support which is sustained from the hook 10, can elevate himself by turning the cranks 9 in a direction to wind up the cable 5 on the drum 4. The weight of the person applies a braking pressure to the brake drum 11, but the pawl-and-ratchet connection between the drum and the shaft 8 will permit the shaft to be freely turned in the direction to wind up the brake drum in a direction to wind up the rope. During this operation the pawl 19 will click over the ratchet 18. When the operator is at the desired height the drum 4 is locked from unwinding through the action of the pawl 19 engaging the ratchet wheel 18. If the operator wishes to lower himself he disengages the pawl 19 from the ratchet 18 by means of the lever 22, and then unwinds the drum 4 by means of the handles 9. During the unwinding movement the brake drum 11 will be rotated with the shaft 8 because of the engagement of the pawls 25 with the ratchet disk 26, and, therefore, the braking action between the brake band 12 and the drum 11 will retard the unwinding movement of the drum 4. Since the degree of braking pressure increases as the weight increases the device will be automatic in its action in that it is as easily controlled when supporting a heavy load as when supporting a light load.

While I have illustrated one embodiment of my invention, I do not wish to be limited to the constructional features shown.

Having fully described my invention, what I claim as new and desire to secure by Letters Patent is:—

1. In a hoisting appliance, the combination with a supporting frame, of a rope-receiving drum journaled in said frame, a crank shaft also journaled in said frame and geared to the drum, a brake drum mounted directly on the crank shaft, a pawl-and-ratchet connection between the brake drum and crank shaft, a brake band encircling the brake drum and anchored at one end, and a pivotally-sustained load-supporting member engaging the other end of the brake band.

2. In a hoisting device, the combination with a frame, of a rope-receiving drum journaled therein, a driving shaft also journaled in the frame, gearing connecting said rope-receiving drum and driving shaft, a brake drum loosely mounted directly on the driving shaft, means for connecting said brake drum and driving shaft, which means permits the shaft to rotate in one direction independently of the brake drum, but compels the brake drum to rotate in the opposite direction with the shaft, a brake band encircling the brake drum, means to support a load from the frame and a connection between said means and the brake band whereby the pressure of the brake band varies with the amount of the load.

3. In a hoisting device, the combination with a frame, of a rope-receiving drum journaled therein, a driving shaft also journaled in the frame beneath the drum and geared thereto, a brake drum loosely mounted directly on the driving shaft, a ratchet member fast on the driving shaft adjacent the end of the drum, spring-pressed pawls situated within the brake drum and projecting through the end thereof and coöperating with the ratchet, a brake band encircling the brake drum and anchored at one end, and load-supporting means having provision for engaging the other end of the brake band whereby the braking pressure varies with the load.

4. In a device of the class described, the combination with a frame, of a drum journaled therein, a cable wound on the drum, a driving shaft also journaled in the frame, gearing connecting said drum and driving shaft, a brake drum loosely mounted on the driving shaft, means connecting said drum and driving shaft, which means permits the shaft to rotate in one direction independently of the drum but compels the drum to rotate in the opposite direction with the shaft, a brake band encircling the drum and provided at one end with a shoulder, a lever pivoted to the frame and having a lip to engage said shoulder, and a load-supporting hook suspended from said lever whereby the braking pressure is proportionate to the load sustained.

5. In a device of the class described, the combination with a frame, of a drum journaled therein, a cable wound on the drum, a driving shaft also journaled in the frame, gearing connecting said drum and driving shaft, a brake drum loosely mounted on the driving shaft, means connecting said drum and driving shaft, which means permits the shaft to rotate in one direction independently of the drum but compels the drum to rotate in the opposite direction with the shaft, a brake band encircling the drum and provided at one end with a shoulder, a lever pivoted intermediate of its ends to the frame and provided at one end with a lip to engage said shoulder, and a load-supporting hook connected to the other end of said lever.

6. In a hoisting device, the combination with a frame comprising two connected side pieces, of a rope-receiving drum journaled in the frame, a cable wound on the drum, a driving shaft journaled in the frame beneath said drum and geared thereto, a brake drum loosely mounted directly on the driving shaft, and pawl-and-ratchet connection between the brake drum and said driving shaft which permits the shaft to rotate in one direction independently of the drum but which locks the drum to the shaft when the latter rotates in the opposite direction, a brake band encircling the brake drum, and a load-supporting member acting on and controlling the operative pressure of the brake band.

7. In a hoisting device, the combination with a frame, of a drum journaled therein, means for operating the drum, a brake drum, connections between said brake drum and the first-named drum which permits said first-named drum to rotate in one direction independently of the brake drum, but compels the brake drum to rotate with the first-named drum in the opposite direction, a brake band encircling the brake drum and provided at one end with a shoulder, a lever pivoted to the frame and having a lip to engage the shoulder, and load-sustaining means carried by said lever.

8. In a hoisting device, the combination with a frame, of a drum journaled therein, a cable wound on the drum, a driving shaft for operating the drum, a brake drum, a pawl-and-ratchet connection between the brake drum and driving shaft, a brake band encircling the brake drum and provided with a shoulder at one end, a lever pivoted to the frame and having a lip to engage said shoulder, and means to suspend the load from the lever.

In testimony whereof, I have signed my name to this specification, in the presence of two subscribing witnesses.

IRA C. MOULTON.

Witnesses:
LOUIS C. SMITH,
THOMAS J. DRUMMOND.

Copies of this patent may be obtained for five cents each, by addressing the "Commissioner of Patents, Washington, D. C."